Dec. 31, 1929. P. J. ADAMOWICZ 1,741,967
BIRD CAGE
Filed Aug. 14, 1928 2 Sheets-Sheet 1
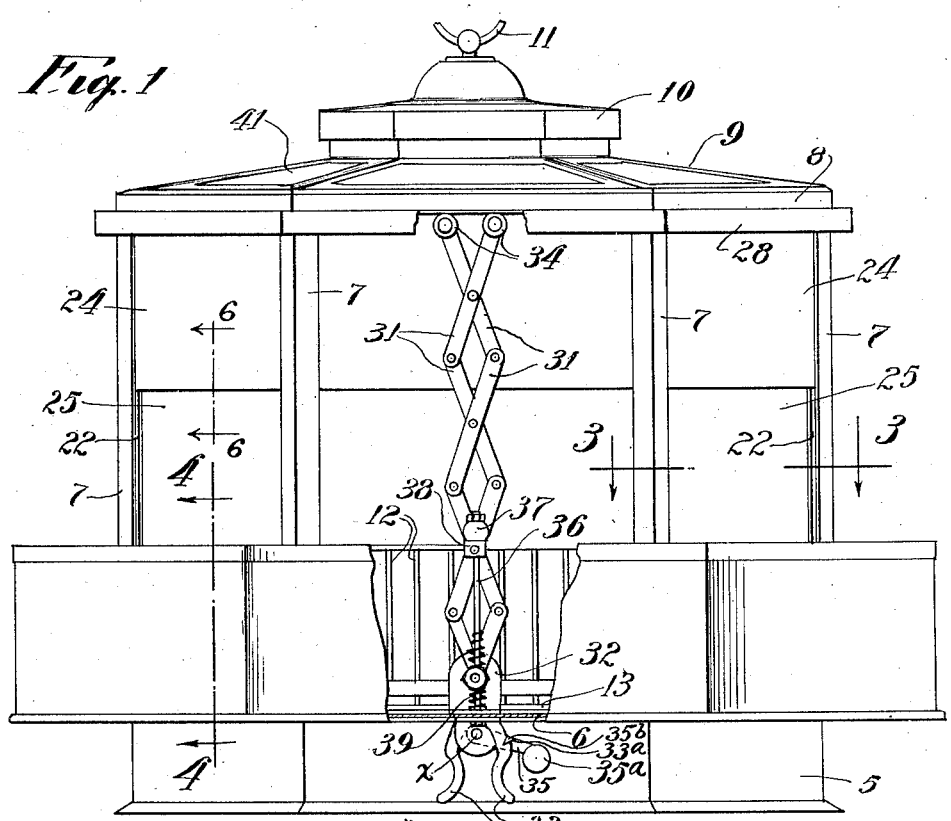
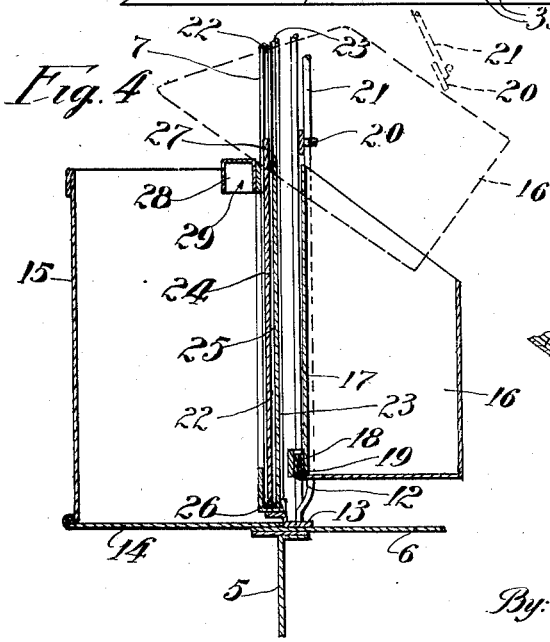
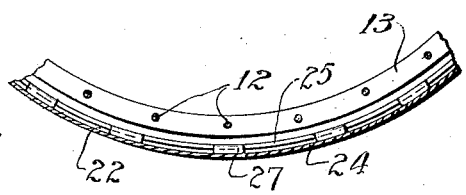
Inventor:
Philip J. Adamowicz
By E. K. Lundy
Attorney.

Dec. 31, 1929. P. J. ADAMOWICZ 1,741,967
BIRD CAGE
Filed Aug. 14, 1928 2 Sheets-Sheet 2
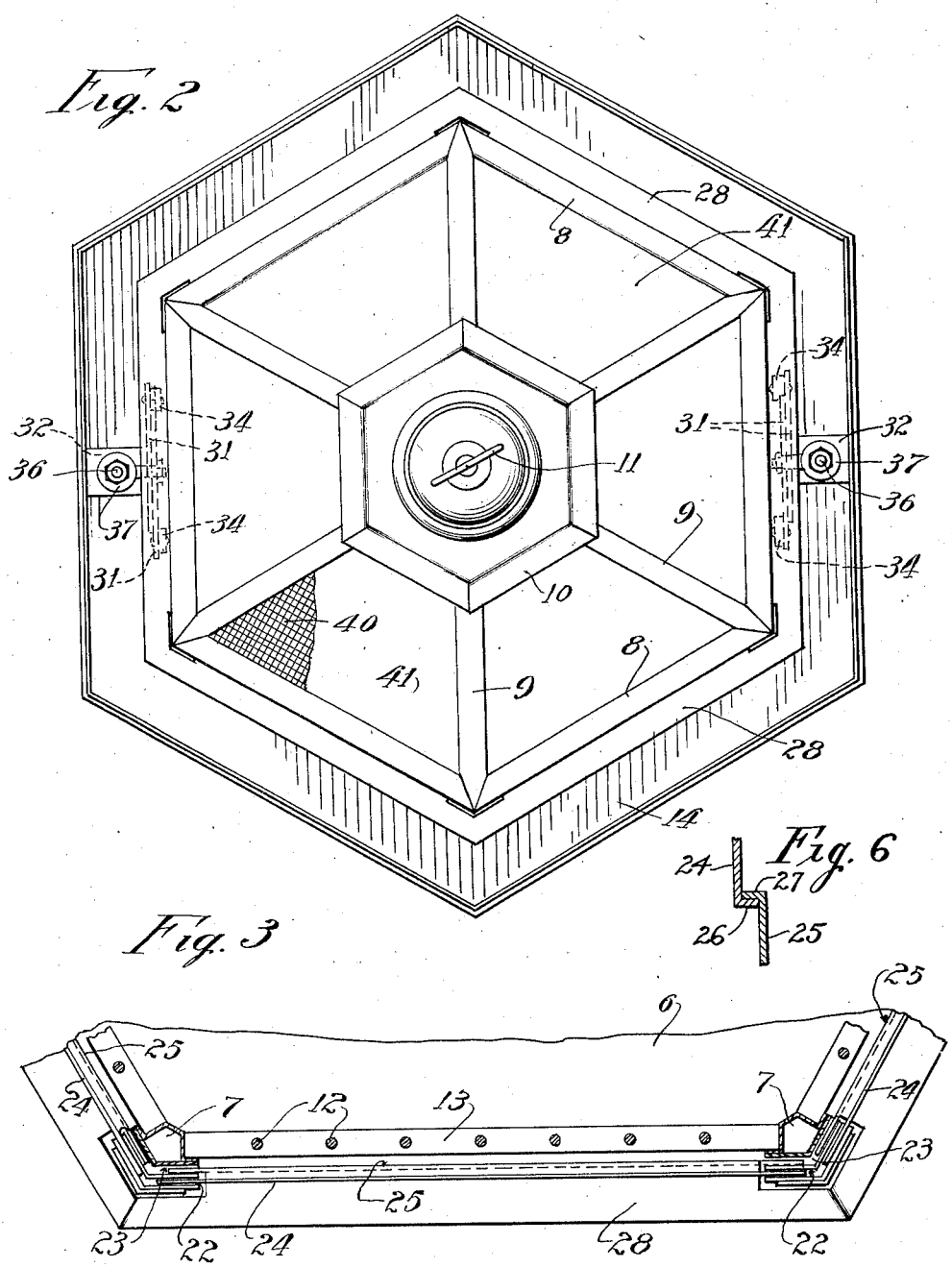
Inventor:
Philip J. Adamowicz.
By E. N. Lundy, Attorney.

Patented Dec. 31, 1929

1,741,967

UNITED STATES PATENT OFFICE

PHILIP J. ADAMOWICZ, OF CHICAGO, ILLINOIS

BIRD CAGE

Application filed August 14, 1928. Serial No. 299,607.

My present invention relates to cages for birds, pet animals and the like, has more particular reference to a cage in which provision is made for enclosing the same for a purpose of shutting out light and thereby darkening the interior of the cage whenever desired, and preventing drafts.

Bird cages are usually made with bars or wires for side walls, with a tray for the bottom or base, and has an open roof or top, all of which are reinforced so as to permit the cage being hung or suspended from the center of the top. On account of the open character of the cages used for birds such as canaries and others of the singing and talking species it is necessary at night to cover or enclose the cage with a dark fabric in order to shut out the light with which the room may be illuminated. This necessitates the provision of a cloth or drapery that must be taken off in the morning and stored away in a convenient place. It is customary to provide in bird cages a guard at or adjacent the walls to prevent the seed being scattered outside the cage when the animal is feeding. This is usually in the form of a wire mesh fastened to the wires, but this sometimes becomes broken while in use so that it is thereafter ineffective to prevent scattering of the seed.

With my present article I have provided a bird cage that has simple means for enclosing and darkening it whenever desired, and I have also provided a guard that is positioned in spaced relation to and outside the walls of the cage so as to catch the seed that may be scattered by the bird. I have also provided simple devices that are adapted to raise and lower the closure walls so that the structure will operate in a dependable manner.

My improved bird-cage has numerous objects in mind, among which are a provision of a cage that is novel and simple in construction and is provided with closure walls having means for operating the same that are easy to manipulate. Also it is an object of my invention to produce a novel bird-cage that can be manufactured and placed upon the market for a reasonable price. I prefer to carry out my invention and to accomplish the numerous objects thereof in substantially the manner hereinafter fully described and as more particularly pointed out in the claims, reference being herein made to the accompanying drawings that form a part of this specification.

In the drawings:—

Fig. 1 is a vertical side elevation of a bird-cage made in accordance with my invention.

Fig. 2 is a top plan of the structure shown in Fig. 1.

Fig. 3 is a horizontal section on line 3—3 of Fig. 1 looking in the direction of the arms.

Fig. 4 is a vertical section on line 4—4 of Fig. 1 looking in the direction of the arrows.

Fig. 5 is a detail of a structure applied to a cylindrical cage and shown in horizontal section.

Fig. 6 is an enlarged detail section on line 6—6 of Figure 1.

The drawings it will be understood are schematic for the purpose of illustrating the preferred or typical manner of putting my invention into practice, and in these drawings I have employed similar reference characters to designate like parts whenever they appear throughout the different views.

The cage comprises a suitable base 5 which, when the cage is placed upon a table will support the floor of the cage silghtly above the table top. The flat floor 6 of the cage is supported by the base 5 and arising from the floor are the posts 7 of angular shape. There are in the present showing preferably six of these posts so that the cage is hexagonal in the contour. Suitable eaves 8 connect the upper ends of the posts as seen in Figs. 1 and 2, and extending vertically upward toward the center or axis of the cage are the roof rafters 9. The posts, the eaves, and the rafters are made of metal strips that are suitably bent into the desired shape and soldered or otherwise secured together the one to the other to provide the skeleton frame-work of the cage. The inner ends of the rafters 9 are connected to a ventilating hood or cap 10 upon the central portion of which there is a ring 11 by which the cage may be supported from a suitable bracket.

The spaces between the posts 7 are barricaded by wire bars 12 the lower ends of which are secured in the base strips 13 extending between the lower ends of the posts, and the upper ends of the wires 12 are connected to the eaves 8.

Projecting horizontally from the base at about the same plane with the floor 6 is an extension floor 14 that projects beyond the confines of the cage walls and at its outer edge is provided with an upstanding partition 15 that rises to a height sufficient to prevent seed scattered by the bird from passing over the same and permits scattered seed to fall on to the extension floor 14.

The feed basin 16 is of rectangular form in horizontal section and is of trough shape with the outer wall 17 taller than the inner wall so that the upper edges of the side walls are oblique as seen in Fig. 4. The lower portion of the wall 17 is provided with a supporting hook 18 to rest upon a horizontal cross piece 19 secured to the walls or body of the cage. To permit access to the interior several of the wires are severed below the upper edge of the basin wall 17 and are connected by a rail 20, while the upper ends of these wires have hinged connection with the cage. The structure provides a gate 21 that normally occupies the position shown in Fig. 4, and in order to remove the basin the fingers are inserted into the basin by swinging the closure gate 21 inwardly so that the cup may be grasped by spreading the fingers and withdrawn. Thereafter the closure gate will gravitate to its normal closed position. The cup or basin is replaced by a reverse operation and the lower edge of the closure member 21 assists in maintaining the cap or basin against accidental dislodgement.

The posts 7 are provided in their facing edges with longitudinal grooves or guides 22 and 23 that are parallel to each other and extend preferably from the top to the bottom of each post. Movable or adjustable partition walls 24 and 25 are slidably mounted in the respective guides and in normal position, when the cage is fully open to admit light, these partitions are in the lowermost portions of the guides as shown in Fig. 4. At the lower edge of the wall 24 there is an inturned flange 26 and at the upper edge of the wall 25 there is an out-turned flange 27. These flanges are of sufficient dimensions to permit them to coact with each other so that when the outer wall 24 is raised until its lower edge is alongside the upper edge of the wall 25 the flange 26 will hook under the flange 27 and a continued movement of the wall 24 will raise other wall 25 with it.

The walls 24 and 25 are of sufficient vertical dimensions so that when one is raised to the eaves they will be in such position that the lower edge of wall 25 will be below the horizontal plane of the top of the upstanding partition 15 and any light that is exterior to the cage will be cut off and does not enter the same. The sliding partition walls may, if desired be operated in pairs, that is, the walls 24 and 25 between any two posts may be raised and a latch may be provided to maintain them in their elevated position. In this way any pair of walls may be raised and the remaining walls may be left in normal position. Thus a suitable shield or wind-break is provided at any desired location around the cage. It may be preferred, however, to move all of the walls surrounding the cage at one time and for this purpose the upper edges of the outer walls 24 are connected to an annulus or ring 28 that conforms to the exterior shape of the cage, in this case hexagonal, and is of inverted U-shape in section as shown in Fig. 4 to provide a downwardly facing channel the purpose of which will be hereinafter explained.

With the structure previously described a person may grasp the annulus 28 upon opposite sides of the cage and by a lifting action raise all of the walls simultaneously until the cage has been surrounded by a partition and closed to exclude light. In order to maintain the structure in this position spring latches may be provided as this would be the simplest form of structure for maintaining the walls in raised positions.

In order to provide an automatic mechanical means for elevating the walls I have provided the mechanism shown in detail in Fig. 1 of the drawings which comprises a collapsible lazy-tongs 31 the lower links of which are pivotably mounted upon an upstanding bearing plate 32 secured to the extension floor 14 of the cage. The lower links pass through an opening in the extension floor and their free ends are formed into finger grips or handles 33. The free ends of the links at the opposite ends of the lazy-tongs are provided with small rollers 34 that fit into the groove or channel 29 in the annulus or ring 28 so that when the handles or finger grips are moved toward each other the lazy-tongs will be extended in the manner shown in Fig. 1 which elevates the closure walls 24 and 25 to the desired position. A swinging arm 35, pivoted on a pin $x$ adjacent the finger grips, has a weight $35^a$ upon its free end and there is a tooth $35^b$ on the arm that drops into a notch $33^a$ in the adjacent edge of one of the lower links of the lazy-tongs near the finger grips 33 when the lazy-tongs are elevated or raised and maintains the lazy-tongs in extended or opened position. By raising the counter-weight of the latch arm 35 the lazy-tongs are released thus permitting them and the partition walls to gravitate to their normal positions.

In order to guide the lazy-tongs in their up and down movement I have provided an upright rod 36, that is secured to the floor at its lower end adjacent the pivot of the lazy-tongs and at its upper end the rod is provided with an enlargement 37 that acts as a stop. A guide block 38 carried by the lazy-tongs slides on the rod 36 and abuts the stop 37 when the closure structure has been raised as seen in Fig. 1. In order to cushion any sudden return of the lazy-tongs, and to avoid the jar incident to the structure returning to normal too rapidly, I surround the rod 36 with a light spring 39 with which a guide block 39 on the lazy-tongs engages when lowered.

It will be understood there are two elevating mechanisms or lazy-tongs structures for elevating the closure structure from opposite sides of the cage so as to prevent the binding of the parts, such as might be the case if a single set of lazy-tongs were employed. It is obvious the operator can manipulate the two mechanisms simultaneously by using both hands to extend or release the lazy-tongs structure.

The roof portion of the cage between the rafters 9 is enclosed by a reticulated or wire mesh fabric 40 and in order to shut out the light from the top or roof of the cage I place a cloth or woven fabric 41 over the wire mesh and secure it to the rafters at the same time the mesh is secured thereto during the process of manufacture.

From the foregoing it will be seen I have provided a very simple means for closing and darkening the interior of the cage whenever it is desired, and I have provided simple means for maintaining the closure in the desired position, as well as a dependable and easily operated mechanism for elevating the partition walls. It will be understood that the precise structure may be modified and changes may be made, depending of course upon the contour of the cage. For example, with a cage that is of cylindrical shape the closure walls would be merely telescopic elements of cylindrical or tubular shape as shown in Figure 5 instead of the separate pairs of walls between the posts. In such a structure the annulus would be dispensed with and provision would be made upon the top of the wall that is to be uppermost when closed to permit the elevation of the closure walls by means of the lazy-tongs. The fact that the seed catcher partition 15 is spaced from the body of the cage permits ready circulation of air throughout the interior during the time the cage is darkened.

The foregoing description and drawings are given for the purpose of clearness of understanding only and no unnecessary limitations or restrictions are to be understood therefrom, but the appended claims are to be construed as broadly as permissible in view of the prior art.

What I claim is:—

1. The combination with a cage having its sides normally open to light, and means for closing the sides of the cage consisting of inner and outer side-by-side closure members arranged for vertical telescopic movement, a lateral flange upon the outer closure member, a lazy-tong anchored at one end to the cage body and having its opposite end engaged with said flange whereby said closure members may be raised and lowered, and means for maintaining said closure members in raised position.

2. The combination with a cage having its sides normally open to light, and means for closing the sides of the cage consisting of a plurality of posts arranged in spaced relation around the sides of the cage and having guides in their facing portions, a plurality of outer closure members positioned between said posts and slidably mounted in said guides, a plurality of inner closure members positioned in said guides back of said outer members and adapted to be moved when the latter are elevated, an annulus encompassing the cage and connected to the outer closure members, a lazy-tong mounted on the cage body and engaged with the annulus whereby the closure members are raised and lowered, and means for maintaining said closure members in raised position.

3. The combination with a cage normally open to light on all sides, of a plurality of inner and outer vertically movable walls extending around said cage, means on said inner and outer walls adapted to interengage when one set of walls is raised, an annular structure connected to certain of said walls and movable in vertical directions, whereby the raising of said annular structure will move all of said inner and outer walls to superposed positions to close the cage to light, and means for maintaining said walls in raised position.

4. The combination with a cage normally open to light on all sides, of a plurality of inner and outer vertically movable walls extending around said cage, guide-members on said cage in which said walls are mounted and which separate said walls into a plurality of sets, means on the inner and outer walls of each set adapted to interengage when one wall of a set is raised, a vertically movable annular structure extending around said walls and connected to one wall of each set, whereby the raising of said annular structure will move said walls to superposed positions to close the cage to light, and means for maintaining said walls in raised position.

5. The combination with a cage normally open to light, of a continuous fixed wall extending upwardly from the floor of the cage and spaced outwardly from said cage, a plurality of inner and outer vertically slidable walls extending around said cage and enclosed by the fixed wall, means on said inner and outer walls of each set adapted to interengage when one of said walls is raised, an annular structure connected to certain of said slidable walls and movable in vertical directions, whereby the raising of said annular structure will move all of said slidable walls to superposed positions above the floor of the cage with the bottom edges of the lower walls below the upper edge of the fixed wall to close the cage to light, and means for maintaining said slidable walls in raised position.

6. The combination with a cage normally open to light, of a vertical partition spaced horizontally outwardly from and surrounding the lower portion of said cage, concentrically arranged telescopically movable walls surrounding said cage and having interengaging portions at opposite horizontal edges that coact with each other when one wall is raised, means connected to certain of said walls that may be moved vertically to successively elevate all of the walls to positions where the bottom edges of the lower walls are below the plane of the top of said partition, and means for releasably maintaining the walls in elevated positions.

Signed at Chicago, Cook County, Illinois, this 11th day of August, 1928.

PHILIP J. ADAMOWICZ.